US012656767B2

(12) United States Patent

Hollender et al.

(10) Patent No.: US 12,656,767 B2

(45) Date of Patent: Jun. 16, 2026

(54) AUTOMATIC IDENTIFICATION OF IMPORTANT BATCH EVENTS

(71) Applicant: ABB Schweiz AG, Baden (CH)

(72) Inventors: Martin Hollender, Dossenheim (DE); Benedikt Schmidt, Heidelberg (DE)

(73) Assignee: ABB Schweiz AG, Baden (CH)

( * ) Notice: Subject to any disclaimer, the term of this patent is extended or adjusted under 35 U.S.C. 154(b) by 427 days.

(21) Appl. No.: 18/212,725

(22) Filed: Jun. 22, 2023

(65) Prior Publication Data

US 2024/0310817 A1      Sep. 19, 2024

Related U.S. Application Data

(63) Continuation of application No. PCT/EP2021/086189, filed on Dec. 16, 2021.

(30) Foreign Application Priority Data

Dec. 23, 2020      (EP) ..................................... 20217000

(51) Int. Cl.
    *G05B 19/418*            (2006.01)

(52) U.S. Cl.
    CPC ...  *G05B 19/41875* (2013.01); *G05B 19/4183* (2013.01); *G05B 2219/13011* (2013.01)

(58) Field of Classification Search
    CPC ............ G05B 19/1875; G05B 19/4183; G05B 2219/13011

(Continued)

(56) References Cited

U.S. PATENT DOCUMENTS

2003/0220709  A1*  11/2003  Hartman ................ G06N 20/00
                                                          700/121
2011/0257767  A1    10/2011  Worek
                (Continued)

FOREIGN PATENT DOCUMENTS

CN          101145055 A      3/2008
CN          106873409 A      6/2017
                (Continued)

OTHER PUBLICATIONS

Canadian Intellectual Property Office, Office Action in Canadian Patent Application No. 3,199,691, 8 pp. (Nov. 18, 2024).
(Continued)

*Primary Examiner* — Md Azad
(74) *Attorney, Agent, or Firm* — Fitch Even Tabin & Flannery LLP

(57) ABSTRACT

A method for automatic identification of important batch events for a batch execution alignment algorithm, including receiving historical batch data of a batch process, wherein the historical batch data comprises a plurality of batch executions, and wherein each of the plurality of batch executions comprises a plurality of batch events, indicating a specific event of the batch process, and at least one time series of a process variable, indicating a development of the process variable during the batch process; determining a distance between the at least one time series of the plurality of the batch executions for each of the plurality of batch events; and identifying at least one important batch event for a batch execution alignment algorithm with a smallest distance using the determined distances.

10 Claims, 6 Drawing Sheets

Figure 1:
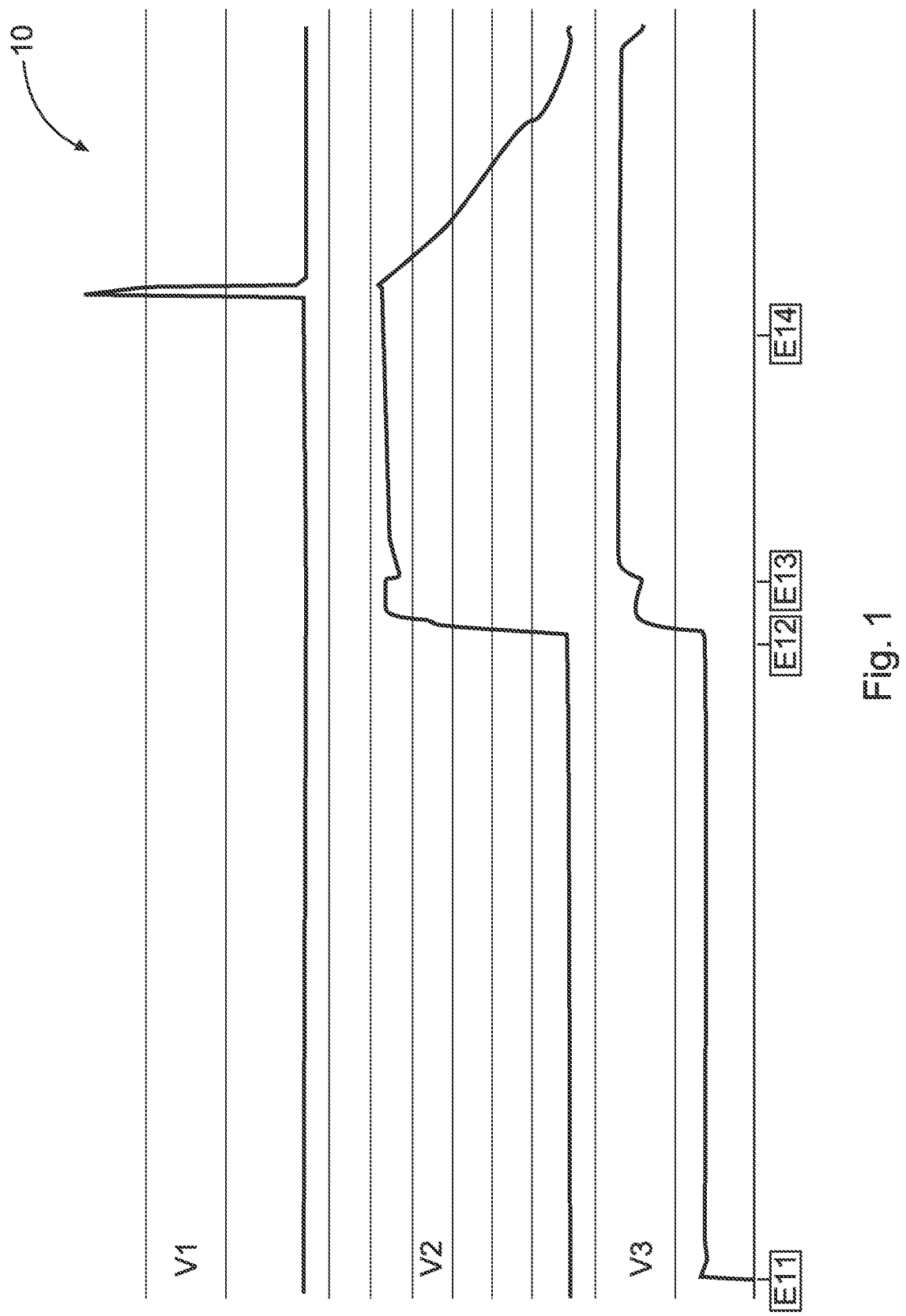

(58) Field of Classification Search
USPC ......................................................... 700/108
See application file for complete search history.

(56) References Cited

U.S. PATENT DOCUMENTS

| | | | |
|---|---|---|---|
| 2011/0288660 A1 | 11/2011 | Wojsznis et al. | |
| 2017/0083012 A1 | 3/2017 | Murray | |
| 2018/0357261 A1 | 12/2018 | Danichev | |
| 2019/0325624 A1* | 10/2019 | McRaven | G06F 11/32 |
| 2019/0332101 A1 | 10/2019 | Castillo Castillo et al. | |
| 2021/0248122 A1* | 8/2021 | Baum | G06F 16/2477 |
| 2022/0035348 A1* | 2/2022 | Ma | G05B 13/048 |
| 2023/0114210 A1* | 4/2023 | Meile | G01B 21/042 |
| | | | 702/95 |

FOREIGN PATENT DOCUMENTS

| | | |
|---|---|---|
| GB | 2482367 A | 2/2012 |
| WO | WO 2019/212653 A1 | 11/2019 |

OTHER PUBLICATIONS

European Patent Office, International Search Report in International Patent Application No. PCT/EP2021/086189, 3 pp. (Apr. 4, 2022).

European Patent Office, Written Opinion in International Patent Application No. PCT/EP2021/086189, 9 pp. (Apr. 4, 2022).

European Patent Office, Extended European Search Report in European Patent Application No. 20217000.7, 11 pp. (May 26, 2021).

Office Action and Search Report issued in corresponding Chinese Application No. 202180086653.4; dated Dec. 12, 2025; in Chinese with English machine translation (12 pages).

* cited by examiner

Fig. 4

AUTOMATIC IDENTIFICATION OF IMPORTANT BATCH EVENTS

CROSS-REFERENCE TO RELATED APPLICATIONS

The instant application claims priority to International Patent Application No. PCT/EP2021/086189, filed Dec. 16, 2021, and to European Patent Application No. 20217000.7, filed on Dec. 23, 2020, each of which is incorporated herein in its entirety by reference.

FIELD OF THE DISCLOSURE

The present disclosure generally relates to automated systems and, more particularly, to identification of important batch events in an industrial process.

BACKGROUND OF THE INVENTION

Batch events allow the separation of important phases in a batch reaction like for example filling, reaction, emptying. Knowledge about such events is important both for online monitoring and offline retrospective analysis. Batch control systems generate such events, but usually only together with less important, arbitrary, or even harmful other events, e.g., operator has acknowledged form, the supply tank is empty, or the reactor needs cleaning.

Such events tell nothing about the progression of a batch execution. Using them for an alignment of different batch executions leads to less meaningful results. In the analysis of batch executions, it is important to separate different operational phases, e.g., preparation—reaction—off-loading, to be able to compare them piece wise with each other, or in other words compare apples with apples. Alignment algorithms that make batch executions equal length as a precondition for multivariate analysis algorithms need meaningful constraints for good performance.

Batch automation systems often deliver so called batch events, timestamps when an operation starts and stops. Many batch events can support alignment algorithms, but some batch events are less or not at all useful. For example, a batch event might occur at a random point of the batch and might have nothing to do with the progression of the batch. The challenge is to identify those batch events that are well suited as support for alignment algorithms.

BRIEF SUMMARY OF THE INVENTION

The present disclosure describes an automatic identification of important batch events for a batch execution alignment algorithm. According to the disclosure, a method for automatic identification of important batch events for a batch execution alignment algorithm comprises the steps: Receiving historical batch data of a batch process, wherein the historical batch data comprises a plurality of batch executions, and wherein each of the plurality of batch executions comprises a plurality of batch events, indicating a specific event of the batch process, and at least one time series of a process variable, indicating a development of the process variable during the batch process. Determining a distance between the at least one time series of the plurality of the batch executions for each of the plurality of batch events. Identifying at least one important batch event for a batch execution alignment algorithm with a smallest distance using the determined distances.

The term "batch process", as used herein, comprises a specific production process with at least one batch reaction like tank filling, reaction and tank emptying.

BRIEF DESCRIPTION OF THE SEVERAL VIEWS OF THE DRAWING(S)

FIG. 1 schematically shows a single batch execution in accordance with the disclosure.

Figure 2:
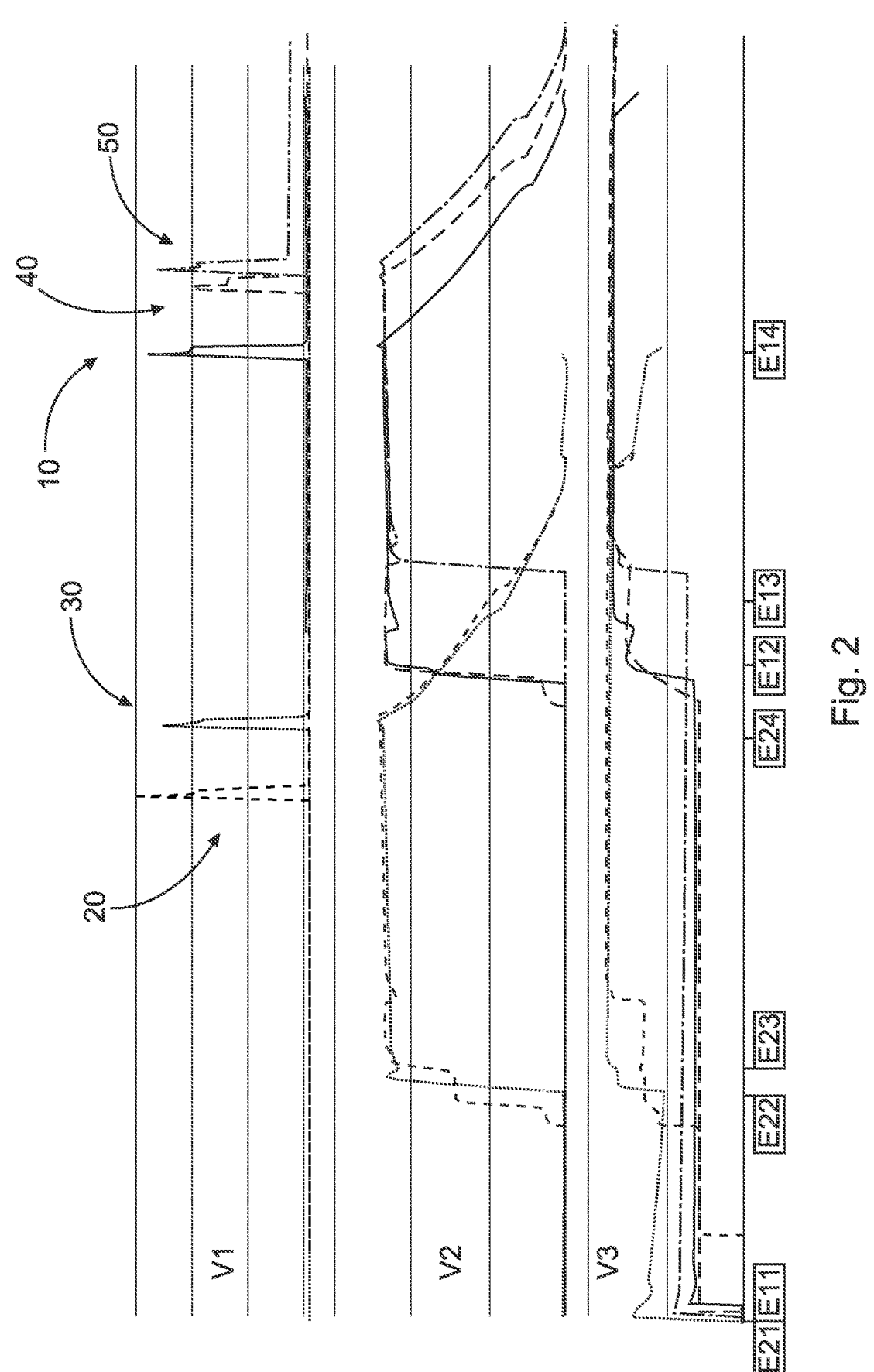

FIG. 2 schematically shows a plurality of batch executions that are not shifted, in accordance with the disclosure.

Figure 3:
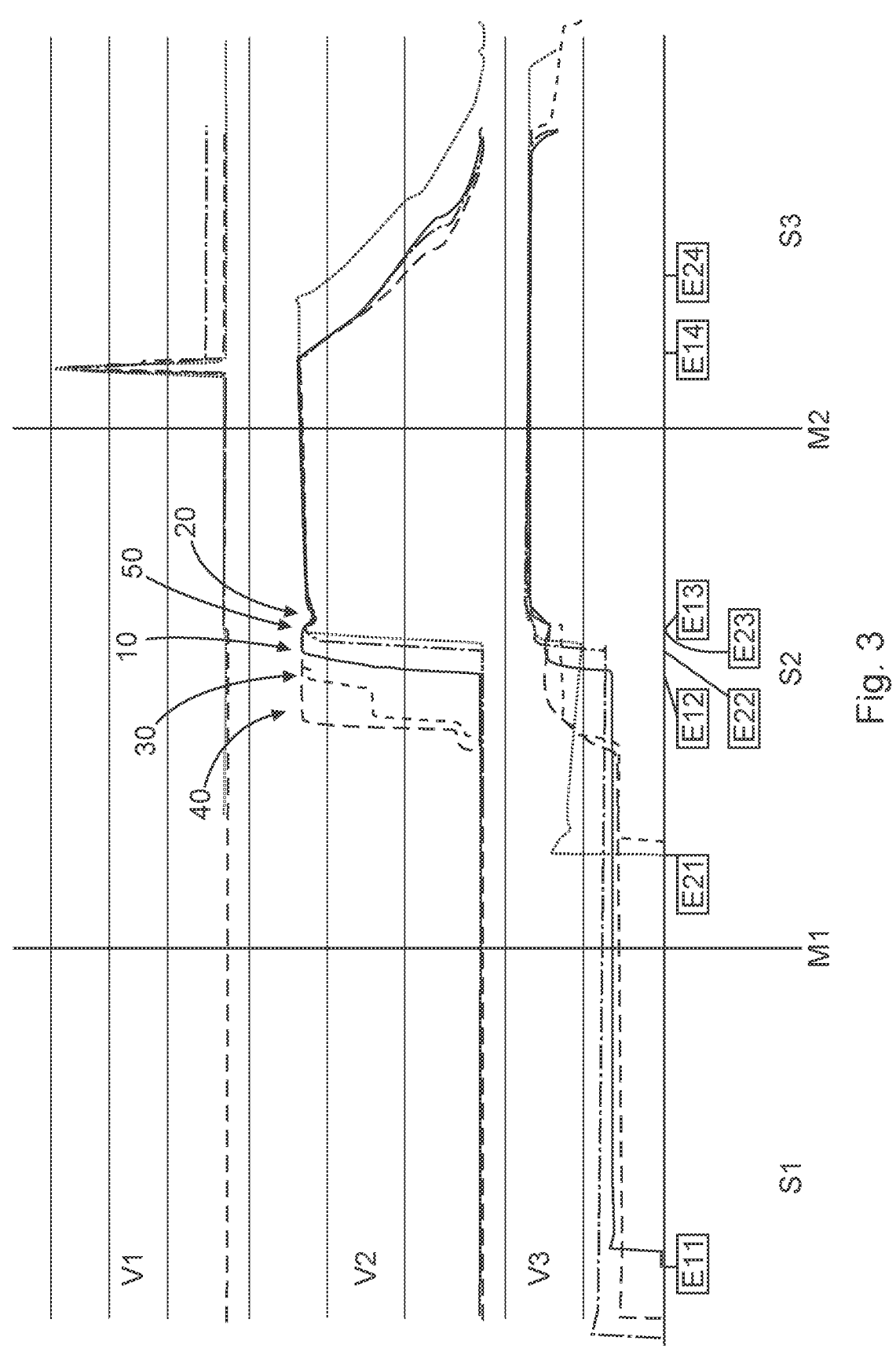

FIG. 3 schematically shows a plurality of batch executions that are shifted onto one batch event, in accordance with the disclosure.

Figure 4:
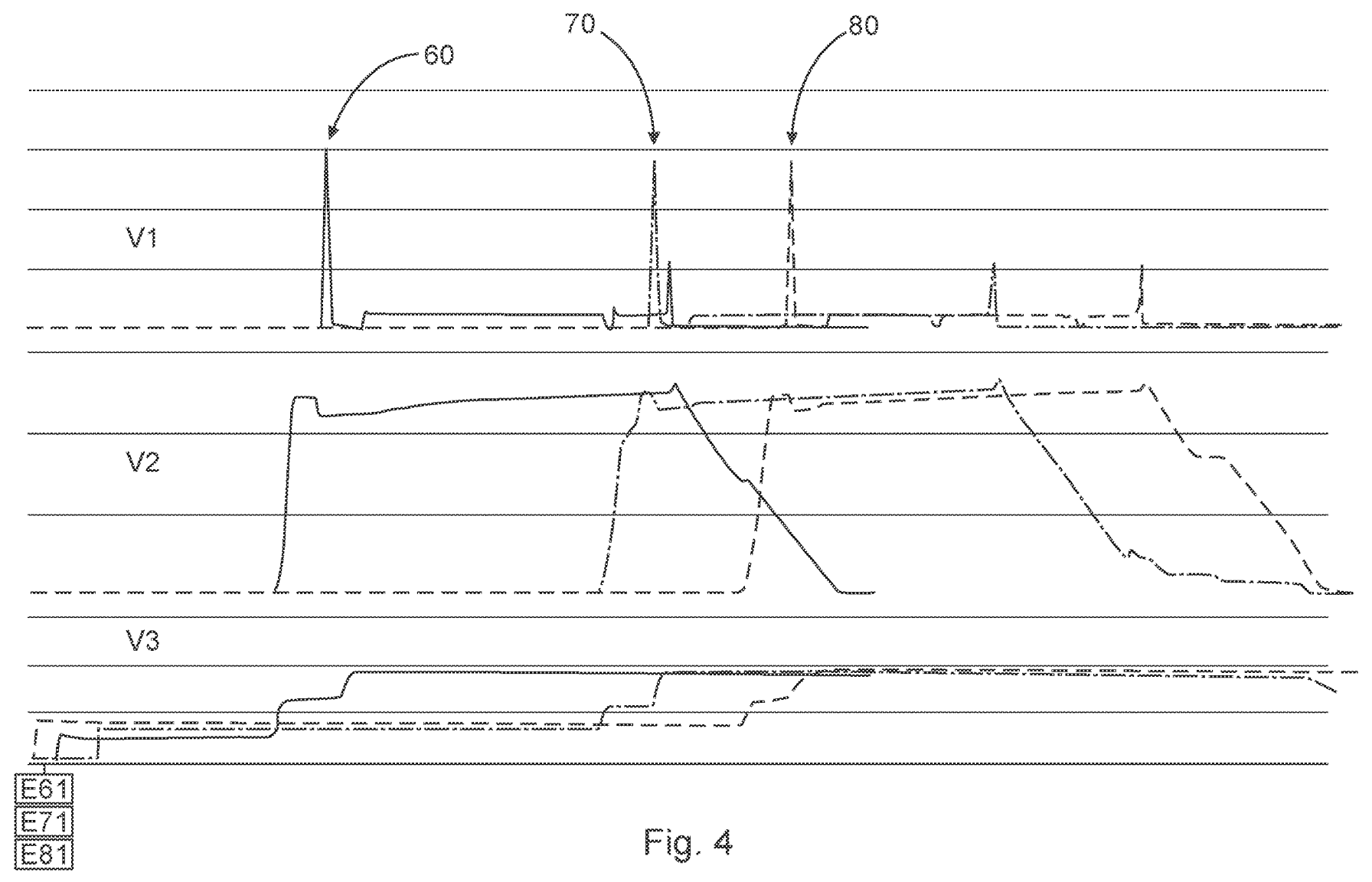

FIG. 4 schematically shows a plurality of batch executions that are shifted onto another batch event resulting in a large distance, in accordance with the disclosure.

Figure 5:
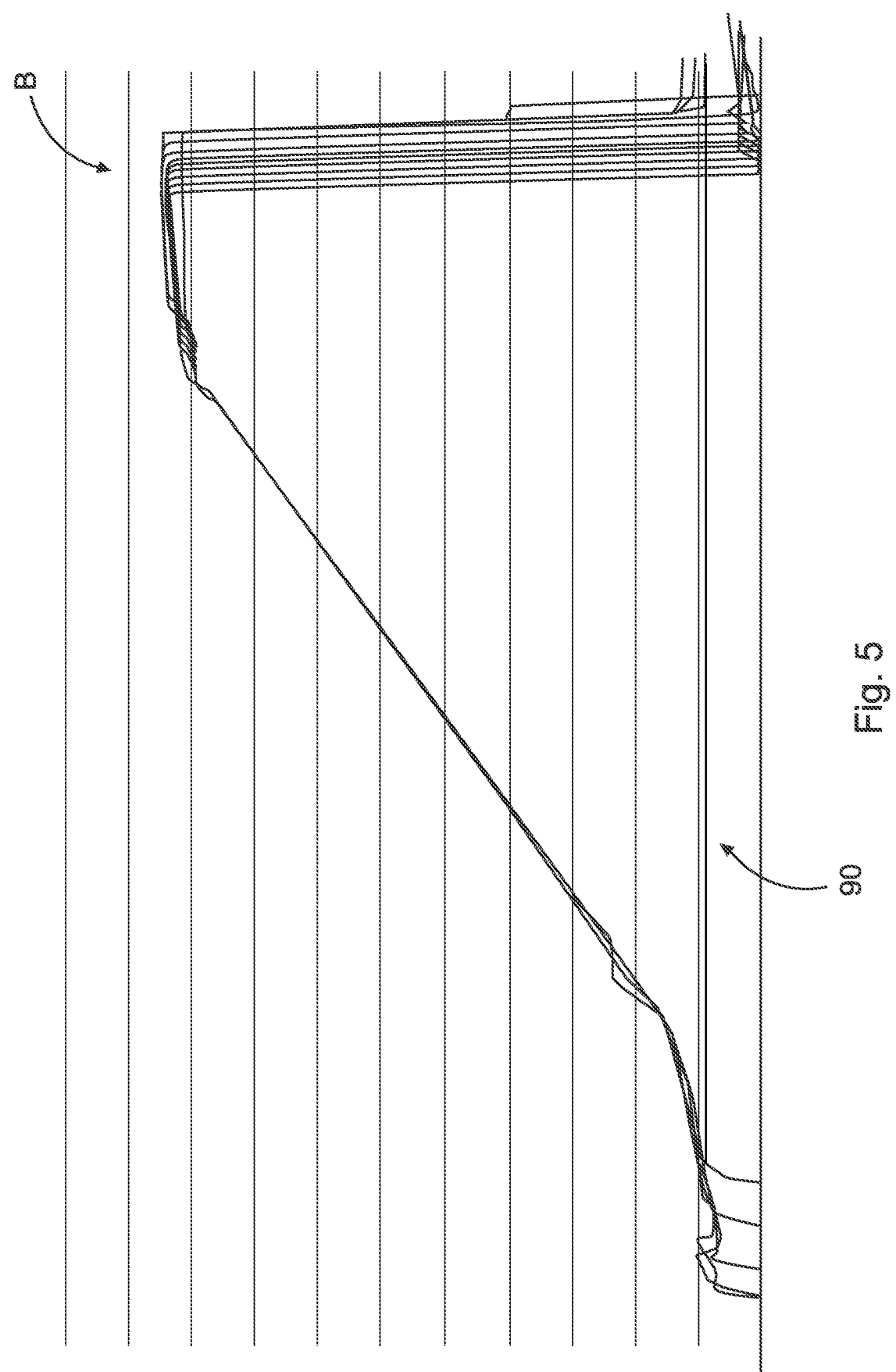

FIG. 5 schematically shows a plurality of batch executions wherein the distance is determined by using or dynamic-time-warping, DTW, in accordance with the disclosure.

Figure 6:
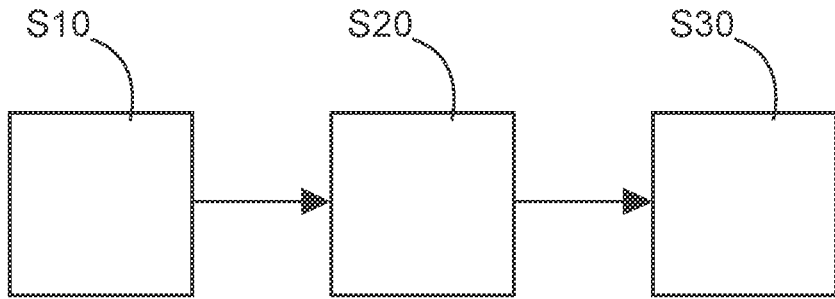

FIG. 6 schematically shows a method for automatic identification of important batch events for a batch execution alignment algorithm, in accordance with the disclosure.

The reference symbols used in the drawings, and their meanings, are listed in summary form in the list of reference symbols. In principle, identical parts are provided with the same reference symbols in the figures.

DETAILED DESCRIPTION OF THE INVENTION

FIG. 1 schematically shows a first batch execution 10. The first batch execution 10 comprises three time series of process variables V1, V2, V3. The first process variable V1 represents a material flow. The second process variable V2 represents a material level. The third process variable V3 represents a temperature of a tank holding the material.

In this example, in the shown batch execution, a material is inserted into a tank. The tank has a specific temperature before the material is inserted into the tank. The material in the tank is processed, wherein the temperature of the tank and the level of the material within the tank changes. After the reaction of the material in the tank, the material is released out of the tank. Thus, the first process variable V1, representing the material flow, peaks, while the second process variable V2, representing the material level, decreases. The third process variable V3, representing the temperature of the tank, slowly decreases with a time delay.

The batch execution comprises four batch events, a first batch event of the first batch execution E11, a second batch event of the first batch execution E12, a third batch event of the third batch execution E13 and a fourth batch event of the first batch execution E14. However, the above chosen numeration of the batch events should not indicate any chronological order of the batch events but rather indicate different batch events. Each batch execution comprises the same batch events.

FIG. 2 schematically shows a plurality of batch executions that are not shifted. In addition to the first batch execution 10, a second batch execution 20, a third batch execution 30, a fourth batch execution 40 and a fifth batch execution 50 are shown. In addition, for the second batch execution 20, a first batch event of the second batch execution E21, a second batch event of the second batch execution E22, a third batch event of the second batch execution E23 and a fourth batch event of the second batch event E24 is indicated.

FIG. 3 schematically shows the plurality of batch executions of FIG. 2. However, the batch executions 10, 20, 30, 40, 50 have been shifted to align the batch executions 10, 20, 30, 40, 50 in the third batch event E13, E23. For visibility reasons, only the third batch event of the first batch execution E13 and the third batch event of the second batch event E23 is indicated.

For the third batch event E13, E23 of each of the batch executions 10, 20, 30, 40, 50 a distance is determined between the time series V1, V2, V3 of the batch executions 10, 20, 30, 40, 50. If the determined distance is considered a smallest distance compared to the determined distances of the other batch events, the third batch event E13, E23 is identified as important batch event.

FIG. 3 also shows a first milestone M1 and a second milestone M2 separating the batch executions 10, 20, 30, 40, 50 into a first section S1, a second section S2 and a third section S3. The third batch event E13, E23 is located in the second section S2.

FIG. 4 schematically shows a plurality of batch executions that are shifted onto another batch event resulting in a large distance. FIG. 4 shows three batch executions, a sixth batch execution 60, a seventh batch execution 70 and an eighth batch execution 80. In this case, the batch executions are shifted onto one batch event, namely a fifth batch event of the sixth batch execution E61, a fifth batch event of the seventh batch execution E71 and a fifth batch event of the eighth batch execution E81. Using this fifth batch event E61, E71, E81 to shift the sixth batch execution 60, the seventh batch execution 70 and the eighth batch execution 80 leads to a relatively large distance. Consequently, this batch event will be ranked low compared to other batch events, for example, the second batch event of FIG. 3.

FIG. 5 schematically shows a plurality of batch executions wherein the distance is determined by using or dynamic-time-warping, DTW. FIG. 5 shows a plurality of batch executions B, comprising a ninth batch execution 90. For determining the distances, a DTW algorithm is executed. This DTW algorithm has the property of fitting all batch executions into an area. Batch executions that have executed as expected and thus are considered good batch executions should overlap very well in the DTW algorithm. Batch executions that execute out of the norm and thus are considered bad batch executions do not overlap this well. This is indicated with the ninth batch execution 90, wherein the DTW algorithm cannot fit the batch execution onto the plurality of batch executions B.

FIG. 6 schematically shows a method for automatic identification of important batch events for a batch execution alignment algorithm. In a first step S10, historical batch data of a batch process is received, wherein the historical batch data comprises a plurality of batch executions 10, 20, and wherein each of the plurality of batch executions 10, 20 comprises a plurality of batch events E11, E12, E21, E22, indicating a specific event of the batch process, and at least one time series of a process variable V1, V2, V3, indicating a development of the process variable during the batch process. In a second step S20, a distance between the at least one time series V1, V2, V3 of the plurality of the batch executions 10, 20 for each of the plurality of batch events E11, E12, E21, E22 is determined. In a third step S30, at least one important batch event M1 for a batch execution alignment algorithm with a smallest distance using the determined distances is identified.

Preferably, the batch process comprises a process that leads to the production of finite quantities of material by subjecting quantities of input materials to an ordered set of processing activities over a finite period of time using one or more pieces of equipment.

Preferably, a batch comprises a material that is being produced or that has been produced by a single execution of a batch process or an entity that represents the production of a material at any point in the process.

The term batch execution, as used herein, comprises a specific instance of a batch process. In other words, each execution of the batch process is a different batch execution. As a batch process due to its technical nature and variance does not always execute in the same way, each different execution of the batch process leads to a different batch execution. For example, a common variance is provided by any human interaction in the batch process and/or environmental differences like ambient temperature.

The term "important batch event", as used herein, comprises batch events that are indicative for the progress of the batch process, or in other words the specific batch execution. In contrast to batch events, which are rather arbitrary and that occur at a random point of the batch process and might have nothing to do with the progression of the batch process, important batch events can be used as meaningful constraints for an alignment algorithm.

Preferably, the plurality of batch executions comprises a plurality of executions of the same batch. In other words, each of the plurality of batch executions relates to the same production process. Thus, each batch execution comprises the same batch events, for example "evacuating the tank" or "inserting material X".

Preferably, the distance comprises a multivariate distance or univariate distance, wherein a multivariate distance depends on a plurality of variables and a univariate distance depends on only a single variable. In other words, multivariate means when determining the distance to consider several variables in parallel. So, for example, not only on the flow but also at the temperature, the pressure etc. are considered.

Preferably, the distance is determined using algorithms that use metrics to compare pairwise time series. The result of such algorithm is a distance between the compared time series indicating how far away the different events in the time series are from each other. In other words, two time series with a small distance look more similar in their progression than two time series with a larger distance.

In other words, each batch event is tested, and the ones are selected that minimize the distance for the good batches and maximize the distance for the bad batches for the known historic batches. Thus, an improved method for automatic identification of important batch events for a batch execution alignment algorithm is provided.

In a preferred embodiment, identifying the at least one important batch event comprises, ranking of the batch events using the determined distances and selecting the at least one important batch event (M1) with the highest ranking.

Preferably, a predetermined number of batch events with the highest ranking are selected as the at least one important batch event.

Preferably, the batch events are ranked using an associated distance, which relates to a relative distance compared to all other determined distances of the different batch executions.

In a preferred embodiment, identifying the at least one important batch event comprises determining at least one milestone of the batch process, wherein the at least one milestone divides the batch process in a plurality of sections, and selecting only one important batch event from the at least one important batch event for each of the plurality of sections.

Identifying the important batch events might lead to an accumulation of batch events that are considered important at only a portion of the batch execution. Consequently, for each section only one important batch event is selected. Preferably, for each section, the important batch event with the lowest determined distance is selected and further preferably the other important batch events of the respective sections are discarded.

Thus, it guaranteed that one important batch event is identified for each section of the batch execution.

Preferably, the at least one milestone is determined at predetermined progress levels of the batch execution.

Preferably, a milestone is determined at 30% and 70% of the progress of the batch execution. Further preferably, a milestone is determined at 25%, 50% and 75% of the progress of the batch execution.

Consequently, an improved method for automatic identification of important batch events is provided. In a preferred embodiment, determining the distance comprises the steps: Determining a sum of pairwise distances between the at least one time series of the plurality of batch executions for each of the plurality of batch events, wherein determining the distance comprises determining an average distance using the sum of pairwise distances.

When determining the distance between the at least one time series of the plurality of batch executions, a sum of pairwise distances is determined. Thus, in order to be able to compare the different determined distances of the batch executions, the sum of pairwise differences is divided by an number of determined pairs or in other words steps. Thus, the average distance can be determined.

Consequently, an improved method for automatic identification of important batch events is provided. In a preferred embodiment, determining the distance comprises the follow steps: Shifting the at least one time series of each of the plurality of the batch executions so that the batch event is at a same relative time point, cutting the at least one time series to an equal length, and determining the distance between the at least one shifted time series of the plurality of the batch executions for each of the plurality of batch events.

Preferably, the cutting of the at least one timer series is determined by the batch execution with a minimal length to the left and the batch execution with a minimal length to the right.

In other words, for each batch event, the at least one time series of the batch executions are shifted onto the batch event. As the batch event generally is at a difference time point in each batch execution, the batch execution, and thus the at least one time series of each batch execution, comprise a different relative starting point and a different relative end point. Cutting the at least one time series of each batch execution to the same length allows for providing comparable times series, as the batch events of each time series are aligned, and each times series has the same length.

Alternatively, a length of the time series, or in other words, a left and right border of the time series is predetermined and the at least one time series is cut accordingly.

Consequently, an improved method for automatic identification of important batch events is provided.

In a preferred embodiment, determining the distance comprises the following steps: Determining a non-shifted distance between the at least one none-shifted time series and determining a shifted distance between the at least one shifted time series and if a difference between the non-shifted distance and the shifted distance is below a predetermined threshold, discarding the batch event.

In a preferred embodiment, determining the distance comprises normalizing the at least one process variable.

In other words, each of the at least one process variables are normalized. Preferably, the at least one process variable is normalized, if the distance is a multivariate distance. Preferably, normalizing comprises subtracting the mean and dividing by the standard deviation in order to make the different variables comparable.

In a preferred embodiment, determining the distance comprises using a dynamic-time-warping. DTW, distance. In general, instead of the DTW distance, any distance metric between two time series, for example Mahalanobis distance, R^2 distance, Euclidean distance or Manhattan distance might be used to determine the distance.

The DTW distance as a more complex distance metric can stretch and squeeze curves and therefore compensate irrelevant differences like varying waiting times.

In a preferred embodiment, the batch event comprises timestamps of when a specific operation of the batch process starts and stops.

In a preferred embodiment, the method comprises the step: discarding the batch events with a distance above the predetermined threshold.

In a preferred embodiment, the method is a computer-implemented method.

According to an aspect of the invention, a data processing system comprises means for carrying out the steps of a method, as described herein.

According to an aspect of the invention, a computer program is provided, comprising instructions which, when the program is executed by a computer, cause the computer to carry out the method, as described herein.

According to an aspect of the invention, a computer-readable data carrier is provided having stored there on the computer program, as described herein.

The present invention also relates to a computer program product including computer program code for controlling one or more processors of a device adapted to be connected to a communication network and/or configured to store a standardized configuration representation, particularly, a computer program product including a computer readable medium containing therein the computer program code.

Preferably, the functional modules and/or the configuration mechanisms are implemented as programmed software modules or procedures, respectively; however, one skilled in the art will understand that the functional modules and/or the configuration mechanisms can be implemented fully or partially in hardware.

LIST OF REFERENCE SYMBOLS

- 10 first batch execution
- 20 second batch execution
- 30 third batch execution
- 40 fourth batch execution
- 50 fifth batch execution
- 60 sixth batch execution
- 70 seventh batch execution
- 80 eighth batch execution
- 90 ninth batch execution
- B plurality of batch executions
- V1 first process variable
- V2 second process variable
- V3 third process variable

E11 first batch event of the first batch execution
E12 second batch event of the first batch execution
E13 third batch event of the first batch execution
E14 fourth batch event of the first batch execution
E21 first batch event of the second batch execution
E22 second batch event of the second batch execution
E23 third batch event of the second batch execution
E24 fourth batch event of the second batch execution
E61 fifth batch event of the sixth batch execution
E71 fifth batch event of the seventh batch execution
E81 fifth batch event of the eight batch execution
S1 first section
S2 second section
S3 third section
M1 first milestone
M2 second milestone
E1 important batch event All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having." "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for automatic identification of important batch events for a batch execution alignment algorithm, comprising:

receiving historical batch data of a batch process, wherein the historical batch data comprises a plurality of batch executions, and wherein each of the plurality of batch executions comprises a plurality of batch events, indicating a specific event of the batch process, and at least one time series of a process variable, indicating a development of the process variable during the batch process;

determining a distance between the at least one time series of the plurality of the batch executions for each of the plurality of batch events;

wherein the distance is determined using an algorithm that uses metrics to compare pairwise time series of the at least one time series, wherein a result of the algorithm is a determination of the distance, the distance being between the compared time series and indicating how far away different batch events in the time series are from each other; and identifying at least one important batch event for a batch execution alignment algorithm with a smallest distance using the determined distances, wherein the at least one important batch event comprises batch events that are indicative for the progress of the batch process;

wherein identifying the at least one important batch event comprises:

ranking the batch events using the determined distances; and selecting the at least one important batch event with the highest ranking.

2. The method of claim 1, wherein identifying the at least one important batch event comprises:

determining at least one milestone of the batch process, wherein the at least one milestone divides the batch process in a plurality of sections:

selecting only one important batch event from the at least one important batch event for each of the plurality of sections.

3. The method of claim 1, wherein determining the distance comprises determining a sum of pairwise distances between the at least one time series of the plurality of batch executions for each of the plurality of batch events, wherein determining the distance comprises determining an average distance using the sum of pairwise distances.

4. The method of claim 1, wherein determining the distance comprises:

shifting the at least one time series of each of the plurality of the batch executions so that the batch event of each batch run is at a same relative time point;

cutting the at least one time series to an equal length;

determining the distance between the at least one shifted time series of the plurality of the batch executions for each of the plurality of batch events.

5. The method of claim 4, wherein determining the distance comprises:

determining a non-shifted distance between the at least one non shifted time series and determining a shifted distance between the at least one shifted time series;

and when a difference between the non-shifted distance and the shifted distance is below a predetermined threshold, discarding the batch event.

6. The method of claim 1, wherein determining the distance comprises normalizing the at least one process variable.

7. The method of claim 1, wherein determining the distance comprises using a Euclidian distance or a dynamic-time-warping, DTW, distance.

8. The method of claim 1, wherein the batch event comprises timestamps of when a specific operation of the batch process starts and stops.

9. The method of claim 1, further comprising discarding the batch events with a distance above the predetermined threshold.

10. The method of claim 1, wherein the method is a computer-implemented method.

\*    \*    \*    \*    \*